(12) United States Patent
Johnson

(10) Patent No.: US 8,161,949 B2
(45) Date of Patent: Apr. 24, 2012

(54) EXHAUST GAS RECIRCULATION COOLER SYSTEM

(75) Inventor: Randall L. Johnson, Monee, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 400 days.

(21) Appl. No.: 12/579,608

(22) Filed: Oct. 15, 2009

(65) Prior Publication Data

US 2011/0088671 A1    Apr. 21, 2011

(51) Int. Cl.
- *F02M 25/07* (2006.01)
- *F01N 5/02* (2006.01)
- *F28D 15/00* (2006.01)
- *H02K 7/18* (2006.01)

(52) U.S. Cl. ............... 123/568.12; 60/320; 165/104.21

(58) Field of Classification Search ............ 123/568.12; 165/104.21; 60/320
See application file for complete search history.

(56) References Cited

U.S. PATENT DOCUMENTS

| | | | |
|---|---|---|---|
| 4,204,401 A * | 5/1980 | Earnest ..................... | 60/773 |
| 7,640,967 B2 * | 1/2010 | Bradley et al. ............ | 165/41 |
| 2006/0130470 A1 * | 6/2006 | Dorn et al. ................. | 60/309 |
| 2010/0139626 A1 * | 6/2010 | Raab et al. ................ | 123/568.12 |

* cited by examiner

*Primary Examiner* — Stephen K Cronin
*Assistant Examiner* — Arnold Castro
(74) *Attorney, Agent, or Firm* — Jack D. Nimz; Jeffrey P. Calfa

(57) ABSTRACT

An exhaust gas recirculation cooling system for an internal combustion engine that has an exhaust system is provided. The exhaust gas recirculation cooling system comprises a cooling fluid circuit, an exhaust gas recirculation cooler, a turbine, a condenser, and a compressor. The cooling fluid circuit has a quantity of fluid that circulates through the exhaust gas recirculation cooling system and receives heat from the exhaust gas recirculation cooling system. The exhaust gas recirculation cooler is disposed in fluid communication with the exhaust system to receive engine exhaust gas from the engine and to remove heat from the exhaust gas. The exhaust gas recirculation cooler additionally disposed in fluid communication with the cooling fluid circuit. The cooling fluid within the cooling fluid circuit receives heat within the exhaust gas recirculation cooler. The turbine is disposed in fluid communication with the cooling fluid circuit. The turbine converts heat energy within the cooling fluid circuit to mechanical energy. A condenser is disposed in fluid communication with the cooling fluid circuit. The condenser cools fluid within the cooling fluid circuit. The compressor is also disposed in fluid communication with the cooling fluid circuit. The compressor pressurizes the fluid within the cooling fluid circuit and circulates the fluid within the cooling fluid circuit.

20 Claims, 2 Drawing Sheets

EXHAUST GAS RECIRCULATION COOLER SYSTEM

TECHNICAL FIELD

The present disclosure relates to an exhaust gas recirculation (EGR) system for a diesel engine, and more particularly to an EGR system having an EGR cooler system to lower a temperature of exhaust gas within the EGR system.

BACKGROUND

Many factors, including environmental responsibility efforts and modern environmental regulations on diesel engine exhaust emissions have reduced the allowable acceptable levels of certain pollutants that enter the atmosphere following the combustion of fossil fuels. Increasingly more stringent emission standards may require greater control over either or both the combustion of fuel and post combustion treatment of the exhaust. For example, the allowable levels of nitrogen oxides (NOx) and particulate matter have been greatly reduced over the last several years. To address, among other issues, environmental concerns, many diesel engines now have an exhaust gas recirculation (EGR) system that directs some exhaust gas from an exhaust system of the diesel engine into an air intake of the diesel engine. It has been found that lower temperature EGR reduces NOx level more effectively than warmer EGR, thus, many diesel engines have an EGR cooler within the EGR system to lower a temperature of the exhaust gas within the EGR system. Many of the EGR coolers utilize engine coolant as a cooling fluid, however, this limits temperature reduction of the exhaust gas passing through the EGR cooler.

Therefore, a need exists for an EGR cooler that does not use engine coolant as the cooling fluid.

SUMMARY OF THE INVENTION

According to one embodiment, an exhaust gas recirculation cooling system for an internal combustion engine that has an exhaust system is provided. The exhaust gas recirculation cooling system comprises a cooling fluid circuit, an exhaust gas recirculation cooler, a turbine, a condenser, and a compressor. The cooling fluid circuit has a quantity of fluid that circulates through the exhaust gas recirculation cooling system and receives heat from the exhaust gas recirculation cooling system. The exhaust gas recirculation cooler is disposed in fluid communication with the exhaust system to receive engine exhaust gas from the engine and to remove heat from the exhaust gas. The exhaust gas recirculation cooler additionally disposed in fluid communication with the cooling fluid circuit. The cooling fluid within the cooling fluid circuit receives heat within the exhaust gas recirculation cooler. The turbine is disposed in fluid communication with the cooling fluid circuit. The turbine converts heat energy within the cooling fluid circuit to mechanical energy. A condenser is disposed in fluid communication with the cooling fluid circuit. The condenser cools fluid within the cooling fluid circuit. The compressor is also disposed in fluid communication with the cooling fluid circuit. The compressor pressurizes the fluid within the cooling fluid circuit and circulates the fluid within the cooling fluid circuit.

A method of cooling exhaust gas recirculation for an engine having an exhaust gas recirculation cooling system that comprises an exhaust gas recirculation cooler, a turbine, a condenser, and a compressor, where the exhaust gas recirculation cooler, turbine, condenser, and compressor are in fluid communication with a cooling fluid circuit containing a cooling fluid, and where the exhaust gas recirculation cooler additionally is in fluid communication with engine exhaust gas, the method produces cooling fluid vapor within an exhaust gas recirculation cooler of a cooling fluid circuit with heat received from engine exhaust gas. Mechanical energy is generated with a turbine utilizing cooling fluid vapor. The generation of mechanical energy with the turbine removes a first amount of heat from the cooling fluid vapor. A second amount of heat is removed from the cooling fluid vapor with a condenser. The second amount of heat is sufficient to restore the cooling fluid to a liquid. The cooling fluid is pressurized with a compressor. The compressor additionally pumps the cooling fluid through the exhaust gas recirculation cooling system. The compressor is in mechanical communication with the turbine to receive at least a portion of the mechanical energy generated by the turbine to power the compressor.

According to another embodiment, an exhaust gas recirculation cooling system for an internal combustion engine that has an exhaust system is provided. The exhaust gas recirculation cooling system comprises a cooling fluid circuit, an exhaust gas recirculation cooler, a turbine, a compressor, and electrical power generating means. The cooling fluid circuit has a quantity of fluid adapted to circulate through the exhaust gas recirculation cooling system and receive heat from the exhaust gas recirculation cooling system. The exhaust gas recirculation cooler is disposed in fluid communication with the exhaust system to receive engine exhaust gas from the engine and remove heat from the exhaust gas. The exhaust gas recirculation cooler additionally is disposed in fluid communication with the cooling fluid circuit. The cooling fluid within the cooling fluid circuit receives heat within the exhaust gas recirculation cooler. The turbine is disposed in fluid communication with the cooling fluid circuit. The turbine converts heat energy within the cooling fluid circuit to mechanical energy. The compressor is disposed in fluid communication with the cooling fluid circuit. The compressor pressurizes the fluid within the cooling fluid circuit and circulates the fluid within the cooling fluid circuit. The compressor additionally is disposed in mechanical communication with the turbine to receive at least a portion of the mechanical energy generated by the turbine. The electrical power generating means is disposed in mechanical communication with the turbine and generates electrical energy.

DETAILED DESCRIPTION

Figure 1:
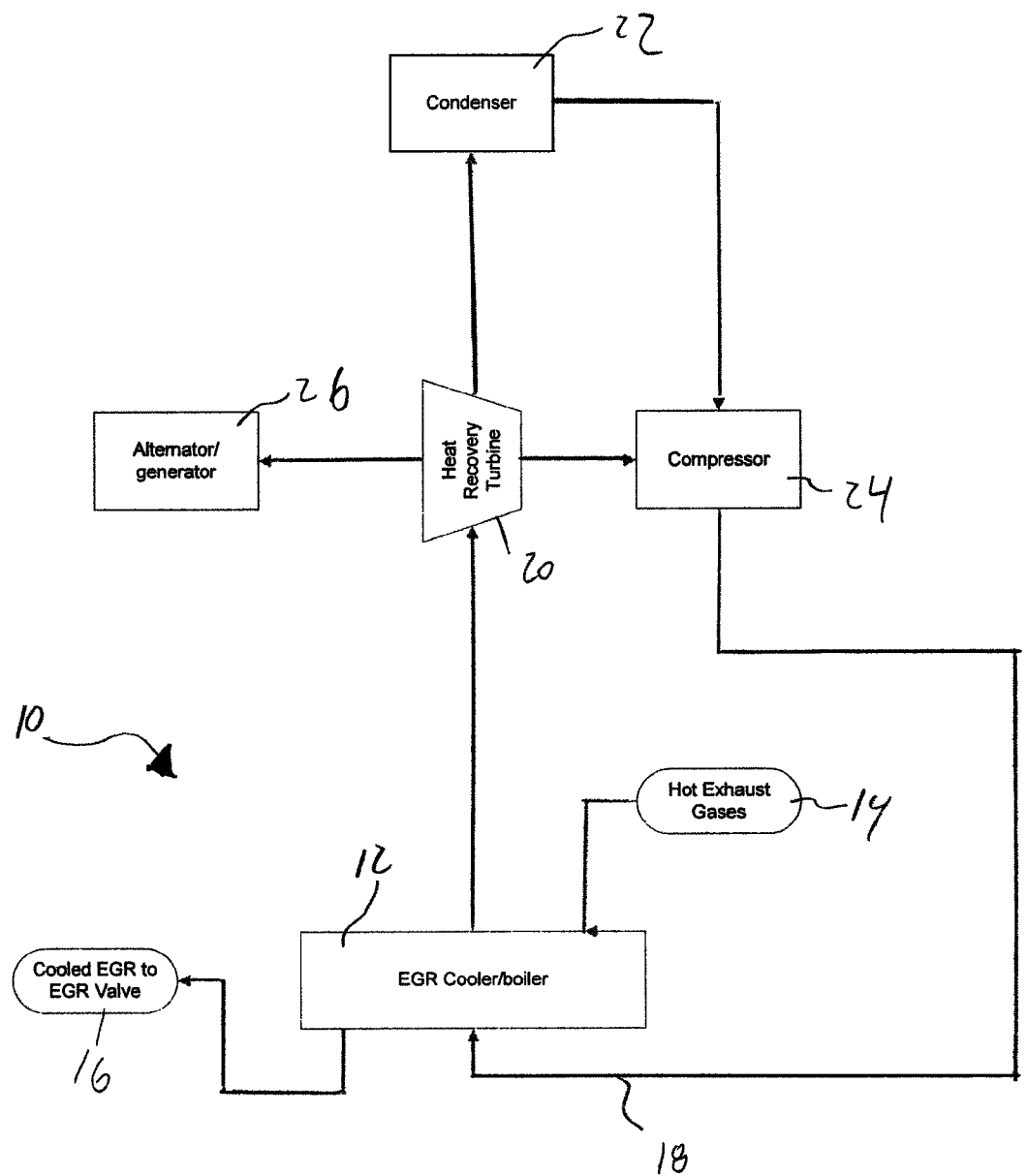
FIG. 1 is a functional diagram showing an EGR cooler system according to one embodiment.

According to one embodiment as shown in FIG. 1, an EGR cooler system 10 for an internal combustion engine is provide. The EGR cooler system comprises an EGR cooler 12 that receives hot exhaust gas 14 from an exhaust of the engine at an input of the EGR cooler 12 and produces cooled exhaust gas 16 at an output of the EGR cooler 12. The EGR cooler 12 additionally receives a cooling fluid that is used as a heat sink within the EGR cooler 12 to receive heat from the exhaust gas that passes through the EGR cooler 12. The cooling fluid is contained within a cooling fluid circuit 18. The cooling fluid circuit 18 is a closed system that is separate from a cooling system for the engine. The cooling fluid circuit 18 causes fluid to enter the EGR cooler 12 and receive heat from the hot exhaust gas 14. It is contemplated that the cooling fluid is allowed to boil within the EGR cooler 12 to produce a pressurized vapor.

Once the cooling fluid leaves the EGR cooler 12, the fluid enters a turbine 20. The turbine 20 is driven by the pressurized vapor formed within the cooling fluid circuit 18 while the cooling fluid is within the EGR cooler 12. As will be discussed in more detail below, the turbine 20 may be used to perform useful work.

The cooling fluid leaves the turbine 20 and enters a condenser 22. The condenser 22 allows the cooling fluid vapor within the cooling fluid circuit 18 to cool and return to a liquid phase from a vapor phase. The cooling fluid next moves to a compressor 24 within the cooling fluid circuit 18. The compressor pressurizes the cooling fluid and pumps the cooling fluid through the cooling fluid circuit 18.

The turbine 20 is connected to the compressor 24 and a generator or alternator 26. The generator or alternator 26 is adapted to produce electrical power. As the heated cooling fluid vapor passes through the turbine 20, the turbine 20 rotates. The rotation of the turbine 20 may be used to drive both the generator or alternator 26 and the compressor 24. Thus, a portion of the heat within the cooling fluid is converted into mechanical energy by the turbine 20. A portion of the mechanical energy of the turbine 20 may be in turn be converted to electrical energy by the generator or alternator 26. Additionally, some of the mechanical energy generated by the turbine 20 may be used to drive the compressor 24.

The turbine 20 the generator or alternator 26, and the compressor 24 are in mechanical communication, that is, rotation of the turbine 20 transfers energy via a shaft, or other rotational connector such as gears, a belt drive, or the like, such that motion of the turbine 20 may cause motion in the generator or alternator 26 and the compressor 24.

The electrical power generated by the alternator or generator 26 may be transmitted to an electrical system of a vehicle containing the engine. In this way, it may be possible to remove a vehicle alternator that is belt-driven via an engine crank pulley.

The cooling fluid circuit 18 of EGR cooling system 10 operates on a Rankine cycle. As such, the EGR cooler 12 converts the cooling fluid in the cooling fluid circuit 18 into a vapor. This vapor is then used to drive the turbine 20. The condenser 22 allows the vapor in the cooling fluid circuit 18 to return to a liquid state.

The EGR cooling system 10 utilizes a cooling fluid other than engine coolant. Using a fluid other than engine coolant allows the cooled EGR 16 exiting the EGR cooler 12 to be at a lower temperature, as the EGR cooling system may be sized to produce low cooled EGR 16 temperatures. These lower EGR temperatures improve engine emissions, particularly NOx emissions.

Further, it is contemplated that the cooling fluid used in the EGR cooling system 10 is a fluid other than water. Using the EGR cooling system 10 may allow an engine cooling system and radiator to be reduced in size as the engine cooling system will not be required to cool a fluid accepting heat from the EGR cooler 12. The reduction in size of the engine cooling system allows for an increase in vehicle fuel economy, due to weight savings, from using smaller components, and increased thermal efficiency of the engine cooling system.

Figure 2:
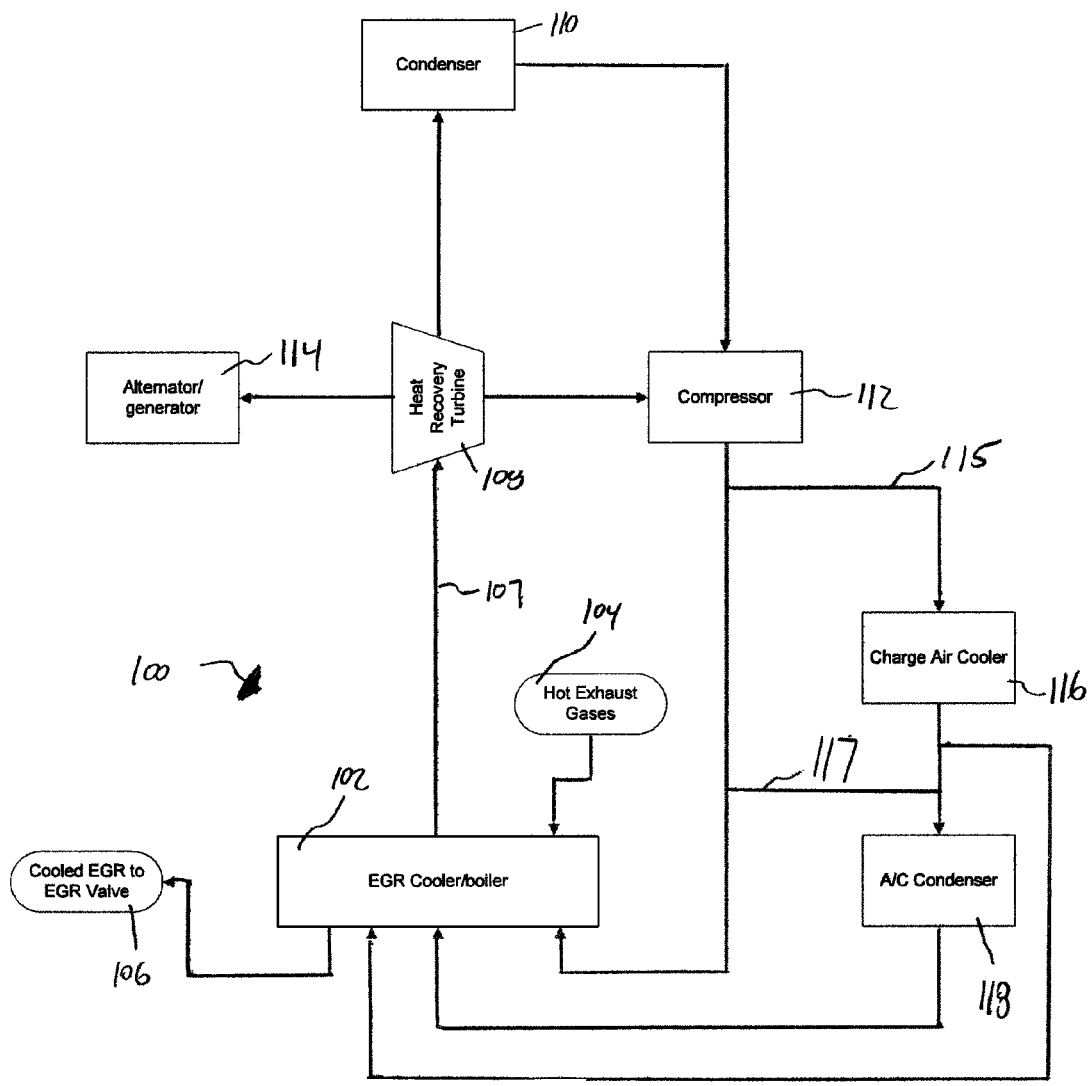
FIG. 2 is a functional diagram showing an EGR cooler system according to another embodiment.

Turning now to FIG. 2, an EGR cooler system 100 for an internal combustion engine, such as a diesel engine is provided. The EGR cooler system 100 comprises an EGR cooler 102 that receives hot exhaust gas 104 from an exhaust of the engine at an input of the EGR cooler 102 and produces cooled exhaust gas 106 at an output of the EGR cooler 102. The EGR cooler 102 additionally receives a cooling fluid that is used as a heat sink within the EGR cooler 102 to receive heat from the exhaust gas that passes through the EGR cooler 102. The cooling fluid is contained within a cooling fluid circuit 107. The cooling fluid circuit 107 is a closed system that is separate from a cooling system for the engine. The cooling fluid circuit 107 causes fluid to enter the EGR cooler 102 and receive heat from the hot exhaust gas 104. It is contemplated that the cooling fluid is allowed to boil within the EGR cooler 102 to produce a pressurized vapor.

Once the cooling fluid leaves the EGR cooler 102, the fluid enters a turbine 108. The turbine 108 is driven by the pressurized vapor formed within the cooling fluid circuit 107 while the cooling fluid is within the EGR cooler 102. As will be discussed in more detail below, the turbine 108 may be used to perform useful work.

The cooling fluid leaves the turbine 108 and enters a condenser 110. The condenser 110 allows the cooling fluid vapor within the cooling fluid circuit 107 to cool and return to a liquid phase from a vapor phase. The cooling fluid next moves to a compressor 112 within the cooling fluid circuit 107. The compressor 112 pressurizes the cooling fluid and pumps the cooling fluid through the cooling fluid circuit 107.

The turbine 108 is connected to the compressor 112 and a generator or alternator 114. The generator or alternator 114 is adapted to produce electrical power. As the heated cooling fluid vapor passes through the turbine 108, the turbine 108 rotates. The rotation of the turbine 108 may be used to drive both the generator or alternator 114 and the compressor 112. Thus, a portion of the heat within the cooling fluid is converted into mechanical energy by the turbine 108. A portion of the mechanical energy of the turbine 108 may the in turn be converted to electrical energy by the generator or alternator 114. Additionally, some of the mechanical energy generated by the turbine 108 may be used to drive the compressor 112.

The electrical power generated by the alternator or generator 114 may be transmitted to an electrical system of a vehicle containing the engine. In this way, it may be possible to remove a vehicle alternator that is belt-driven via an engine crank pulley.

The cooling fluid circuit 107 of EGR cooling system 100 operates on a Rankine cycle. As such, the EGR cooler 102 converts the cooling fluid in the cooling fluid circuit 107 into a vapor. This vapor is then used to drive the turbine 108. The condenser 110 allows the vapor in the cooling fluid circuit 107 to return to a liquid state.

In addition to providing cooling to the EGR cooler 102, the cooling fluid circuit 107 may include a first cooling fluid sub-circuit 115. The first cooling fluid sub-circuit includes a charge air cooler 116. The charge air cooler 116 is adapted to remove heat from air in an air intake system of the engine that has been compressed, such as with a turbocharger or a supercharger. The use of the charge air cooler 116 allows an increase in the volume of air that enters the engine to be used in combustion, as the density of the air is increased as the temperature of the air is reduced by the charge air cooler 116.

The first cooling fluid sub-circuit 115 is in fluid communication the cooling fluid circuit 107. That is, a portion of the cooling fluid that circulates through the cooling fluid circuit 107 circulates through the first cooling fluid sub-circuit 115. The first cooling fluid sub-circuit 115 is a closed circuit, such that any fluid received in the first cooling fluid sub-circuit 115 from the cooling fluid circuit 107, is later returned to the cooling fluid circuit 107.

The cooling fluid circuit 107 may also include a second cooling fluid sub-circuit 117. The second fluid cooling sub-circuit 117 includes an air-conditioner condenser 118. The air-conditioner condenser 118 is adapted to cool air used in a climate control system of the vehicle. The use of the second fluid cooling sub-circuit 117 to provide working fluid to the air-conditioner condenser 118 allows the elimination of a separate air-conditioner compressor. The removal of the separate air-conditioner compressor reduces engine load, thus, fuel economy of the engine is increased.

It is additionally contemplated that other cooling fluid sub-circuits may be used. For example, a cooling fluid sub-circuit may be proceed for use with a transmission cooler to remove heat from transmission fluid of a vehicle. Similarly, a cooling fluid sub-circuit may be provided to an engine, or a radiator for an engine to remove heat from the engine itself Providing additional cooling fluid sub-circuits may require additional cooling fluid within the cooling fluid circuit, and may require a larger turbine, a larger condenser, and a larger compressor in order to remove heat from the cooling fluid circuit and the fluid cooling sub-circuit.

What is claimed is:

1. An exhaust gas recirculation cooling system for an internal combustion engine having an exhaust system, the exhaust gas recirculation cooling system comprising:
 a cooling fluid circuit including a cooling fluid to circulate through the exhaust gas recirculation cooling system and receive heat from the exhaust gas recirculation cooling system;
 an exhaust gas recirculation cooler disposed in fluid communication with the exhaust system to receive engine exhaust gas from the engine and remove heat from the exhaust gas, the exhaust gas recirculation cooler additionally disposed in fluid communication with the cooling fluid circuit, the cooling fluid within the cooling fluid circuit receiving heat within the exhaust gas recirculation cooler;
 a turbine disposed in fluid communication with the cooling fluid circuit, the turbine converting heat energy within the cooling fluid circuit to mechanical energy;
 a condenser disposed in fluid communication with the cooling fluid circuit, the condenser cooling fluid within the cooling fluid circuit; and
 a compressor disposed in fluid communication with the cooling fluid circuit, the compressor pressurizing the fluid within the cooling fluid circuit and circulating the fluid within the cooling fluid circuit.

2. The exhaust gas recirculation cooling system of claim 1, wherein the cooling fluid is heated to a vapor phase within the exhaust gas recirculation cooler.

3. The exhaust gas recirculation cooling system of claim 2, wherein the cooling fluid is cooled to a liquid phase within the condenser.

4. The exhaust gas recirculation cooling system of claim 1, wherein the compressor is disposed in mechanical communication with the turbine to receive at least a portion of the mechanical energy generated by the turbine.

5. The exhaust gas recirculation system of claim 1 further comprising a generator, the generator disposed in mechanical communication with the turbine to receive at least a portion of the mechanical energy generated by the turbine, the generator generating electrical energy.

6. The exhaust gas recirculation system of claim 1 further comprising an alternator, the alternator disposed in mechanical communication with the turbine to receive at least a portion of the mechanical energy generated by the turbine, the alternator generating electrical energy.

7. The exhaust gas recirculation system of claim 1 further comprising a charge air cooler disposed in fluid communication with cooling fluid circuit, the cooling fluid within the cooling fluid circuit receiving heat within the charge air cooler.

8. The exhaust gas recirculation system of claim 1 further comprising an air conditioner condenser disposed in fluid communication with cooling fluid circuit.

9. The exhaust gas recirculation system of claim 1, wherein the cooling fluid is a fluid other than engine coolant.

10. The exhaust gas recirculation system of claim 1, wherein the cooling fluid is a fluid other than water.

11. The exhaust gas recirculation system of claim 1, wherein the system uses a Rankine cycle.

12. A method of cooling exhaust gas recirculation for an engine having an exhaust gas recirculation cooling system comprising an exhaust gas recirculation cooler, a turbine, a condenser, and a compressor, the exhaust gas recirculation cooler, turbine, condenser, and compressor being in fluid communication with a cooling fluid circuit containing a cooling fluid, the exhaust gas recirculation cooler additionally being in fluid communication with engine exhaust gas, the method comprising:
 producing cooling fluid vapor within an exhaust gas recirculation cooler of a cooling fluid circuit utilizing heat received from engine exhaust gas;
 generating mechanical energy with a turbine utilizing cooling fluid vapor, the generating of mechanical energy with the turbine removing a first amount of heat from the cooling fluid vapor;
 removing a second amount of heat from the cooling fluid vapor in a condenser, the second amount of heat being sufficient to restore the cooling fluid to a liquid;
 pressurizing the cooling fluid in a compressor disposed in mechanical communication with the turbine and provided to receive at least a portion of the mechanical energy generated by the turbine to power the compressor; and
 pumping the cooling fluid through the exhaust gas recirculation cooling system using the compressor.

13. The method of claim 12 further comprising:
 generating electrical energy with an alternator, the alternator being disposed in mechanical communication with the turbine to receive a portion of the mechanical energy generated by the turbine to power the alternator.

14. The method of claim 12 further comprising:
 generating electrical energy with a generator, the generator being in mechanical communication with the turbine to receive a portion of the mechanical energy generated by the turbine to power the generator.

15. The method of claim 12, wherein cooling fluid boils within the exhaust gas recirculation cooler to generate the cooling fluid vapor.

16. The method of claim 12 further comprising:
 providing a charge air cooler, the charge air cooler being in fluid communication with the cooling fluid circuit containing the cooling fluid; and
 cooling the charge air cooler with the cooling fluid utilizing the cooling fluid to remove heat from the charge air cooler.

17. The method of claim 12, wherein the cooling fluid circuit operates on a Rankine cycle.

18. An exhaust gas recirculation cooling system for an internal combustion engine having an exhaust system, the exhaust gas recirculation cooling system comprising:
 a cooling fluid circuit having a quantity of fluid adapted to circulate through the exhaust gas recirculation cooling system and receive heat from the exhaust gas recirculation cooling system;

an exhaust gas recirculation cooler disposed in fluid communication with the exhaust system to receive engine exhaust gas from the engine and remove heat from the exhaust gas, the exhaust gas recirculation cooler additionally disposed in fluid communication with the cooling fluid circuit, the cooling fluid within the cooling fluid circuit receiving heat within the exhaust gas recirculation cooler;

a turbine disposed in fluid communication with the cooling fluid circuit, the turbine converting heat energy within the cooling fluid circuit to mechanical energy;

a compressor disposed in fluid communication with the cooling fluid circuit, the compressor pressurizing the fluid within the cooling fluid circuit and circulating the fluid within the cooling fluid circuit, the compressor additionally being disposed in mechanical communication with the turbine to receive at least a portion of the mechanical energy generated by the turbine, and an electrical power generating means disposed in mechanical communication with the turbine for generating electrical energy.

19. The exhaust gas recirculation system of claim 18 further comprising:

a condenser disposed in fluid communication with the cooling fluid circuit, the condenser cooling fluid within the cooling fluid circuit.

20. The exhaust gas recirculation cooling system of claim 18, wherein the cooling fluid is heated to a vapor phase within the exhaust gas recirculation cooler.

\* \* \* \* \*